No. 860,219. PATENTED JULY 16, 1907.
S. J. LARGE.
FORK AND ANALOGOUS IMPLEMENT.
APPLICATION FILED OCT. 10, 1906.
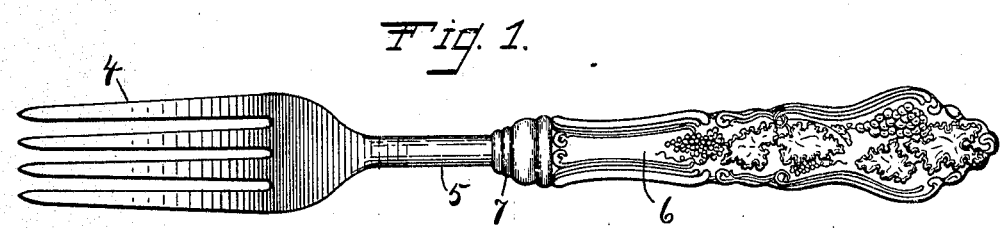
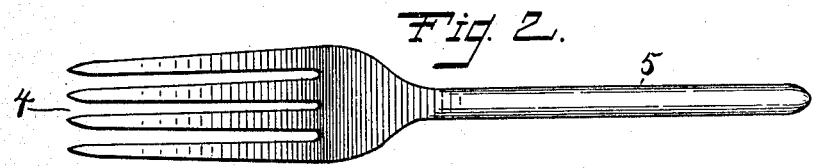
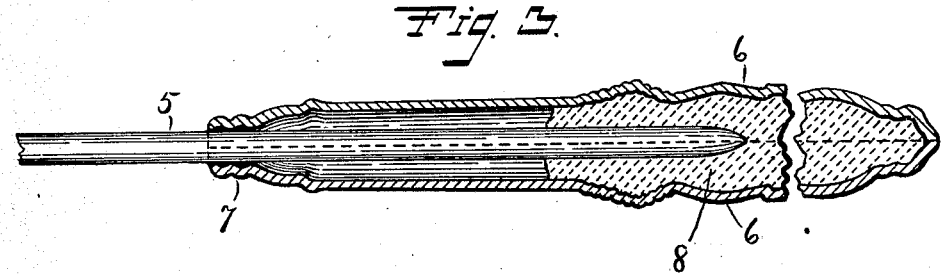
Witnesses.
S. H. Clarke
P. J. Egan
Inventor.
Samuel J. Large
By James Shepard
Atty.

UNITED STATES PATENT OFFICE.

SAMUEL J. LARGE, OF BRISTOL, CONNECTICUT, ASSIGNOR TO AMERICAN SILVER COMPANY, OF BRISTOL, CONNECTICUT, A CORPORATION.

FORK AND ANALOGOUS IMPLEMENT.

No. 860,219.  Specification of Letters Patent.  Patented July 16, 1907.

Application filed October 10, 1906. Serial No. 338,276.

*To all whom it may concern:*

Be it known that I, SAMUEL J. LARGE, a citizen of the United States, residing at Bristol, in the county of Hartford and State of Connecticut, have invented certain new and useful Improvements in Forks and Analogous Implements, of which the following is a specification.

My invention relates to improvements in forks and analogous implements, as for example nut picks, of the class which have hollow sheet metal handles and the object of my improvement is simplicity and economy in construction, whereby a substantial and durable implement is produced at a less cost than heretofore.

In the accompanying drawings:—Figure 1 is a plan view of my fork. Fig. 2 is a detached plan view of the fork tines and shank. Fig. 3 is an enlarged central longitudinal section of the handle with a side elevation of the shank, portions of the said parts being broken away.

The fork tines 4 and shank 5 are made in one piece. The shank is preferably of an oval form in cross section and has straight parallel sides so as to make it substantially of a uniform diameter throughout the major portion of its length, and shoulderless, as shown in Figs. 2 and 3. This is an ordinary form of fork tines and shank but heretofore when they are provided with a handle composed of two sheet metal shells, this shank has had applied to it a bolster and bolster shank, and the sheet metal handle has been secured to the bolster shank and not directly to the shank proper.

The two handle shells 6, 6, are struck up from sheet metal and joined in a longitudinal seam that is soldered or brazed in any ordinary manner, the main portion of the said shell being of an ordinary form. I form integrally with each shell at its smaller end a half bolster or tip 7 that reduces the said smaller end to a size that will receive and substantially fit the diameter of the shank 5. I prefer to make the shank 5 of considerable length so that it will extend well in to the body of the handle. After the two handle shells are properly united with each other the handle is preferably filled or partially filled with cement 8, for loading the handle in the ordinary manner, and also to assist in firmly maintaining the shank in its position within the hollow handle. The shank is inserted in the smaller end of the handle to the desired extent while the cement is soft so as to embed the end in the cement. The bolster portion 7 of the sheet metal handle shells are then brazed or soldered directly to the shank, thereby firmly securing the shank against being pulled out and making a solid union between the bolster and the shank. When the cement is hardened the end of the shank is rigidly held against moving transversely in either direction thereby preventing the shank from acting on the bolster as a fulcrum.

By my improvement a considerable saving is made in the cost of production as I dispense with the separate bolster and bolster shank and with brazing the same, and my implement is in no way inferior to those made in the old way.

I claim as my invention:—

1. A fork or analogous implement having a tine like end, a sheet metal handle and a rounded shank with shoulderless parallel sides, the said sheet metal handle having a reduced bolster portion that is smaller than the rest of the handle, and of a size to fit and receive into its end the said rounded shank, the said handle being brazed or soldered by its bolster portion directly to the shoulderless rounded portion of the said shank with a portion of the said shank extended longitudinally within the handle and another portion of its length outside of the said handle.

2. A fork or analogous implement having a tine like end, a sheet metal handle, a cement filling and a rounded shank with shoulderless parallel sides, the said sheet metal handle having a reduced bolster portion that is smaller than the rest of the handle and of a size to fit and receive into its end the said rounded shank, the said handle being brazed or soldered by its bolster portion directly to the shoulderless rounded portion of the said shank, with a portion of the said shank extended longitudinally within the handle and another portion of its length outside of the said handle while its extreme inner end is embedded in the cement filling at a point remote from the bolster.

SAMUEL J. LARGE.

Witnesses:
 IRA L. NEWCOMB,
 A. D. WILSON.